(12) United States Patent
Son et al.

(10) Patent No.: US 7,696,926 B2
(45) Date of Patent: Apr. 13, 2010

(54) APPARATUS FOR IDENTIFYING TARGET SATELLITE IN SATELLITE COMMUNICATION ANTENNA AND METHOD THEREOF

(75) Inventors: Seong-Ho Son, Busan (KR); Ung-Hee Park, Daejeon (KR); Soon-Young Eom, Daejeon (KR); Soon-Ik Jeon, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 448 days.

(21) Appl. No.: 11/720,749

(22) PCT Filed: Sep. 28, 2005

(86) PCT No.: PCT/KR2005/003221

§ 371 (c)(1), (2), (4) Date: Jun. 1, 2007

(87) PCT Pub. No.: WO2006/080661

PCT Pub. Date: Aug. 3, 2006

(65) Prior Publication Data

US 2009/0160701 A1 Jun. 25, 2009

(51) Int. Cl.
*H01Q 3/00* (2006.01)
*G01S 13/06* (2006.01)
(52) U.S. Cl. .......................... 342/359; 342/75
(58) Field of Classification Search ............ 342/75, 342/76, 81, 359; 343/757, 758
See application file for complete search history.

(56) References Cited

U.S. PATENT DOCUMENTS

| | | | | | |
|---|---|---|---|---|---|
| 4,801,940 | A | * | 1/1989 | Ma et al. | 342/359 |
| 5,867,783 | A | * | 2/1999 | Horstein et al. | 455/427 |
| 5,978,653 | A | * | 11/1999 | Taylor et al. | 455/13.1 |
| 6,606,074 | B1 | * | 8/2003 | Allnutt | 343/815 |

FOREIGN PATENT DOCUMENTS

| | | |
|---|---|---|
| JP | 7-263938 | 10/1995 |
| JP | 10-190338 | 7/1998 |
| JP | 11266109 | 9/1999 |
| JP | 2000-299655 | 10/2000 |
| KR | 1999-0078457 | 10/1999 |
| KR | 10-2004-0035666 | 4/2004 |
| WO | WO-01/06593 | 1/2001 |

* cited by examiner

*Primary Examiner*—Dao L Phan
(74) *Attorney, Agent, or Firm*—Rabin & Berdo, P.C.

(57) ABSTRACT

Provided is an apparatus and method for identifying a target satellite in a satellite communication antenna. The apparatus includes: a power splitting unit for splitting a signal inputted through the satellite communication antenna to more than two signals; a tuner unit for receiving the split signals from the power splitting unit and passing only signal of a predetermined channel frequency band; an analog-to-digital converting unit for converting each of signal intensities passed in the tuner unit to a digital value; and a controlling and identifying unit for determining whether a satellite traced by the satellite communication antenna is a target satellite using each of the signal intensities of the predetermined channel frequency band inputted from the A/D converting means, and controlling an orientation direction of the satellite communication antenna.

9 Claims, 3 Drawing Sheets

APPARATUS FOR IDENTIFYING TARGET SATELLITE IN SATELLITE COMMUNICATION ANTENNA AND METHOD THEREOF

TECHNICAL FIELD

The present invention relates to an apparatus for identifying a target satellite in a satellite communication antenna and a method thereof, and more particular to a target satellite identifying apparatus in a mobile satellite communication antenna for determining whether the satellite antenna points to a target satellite by analyzing a satellite downlink frequency spectrum, and a method thereof.

BACKGROUND ART

There has been a great demand for receiving a digital broadcasting and a high-capacity and high-speed multimedia service using a satellite in a mobile environment. In order to satisfy such a demand, a number of satellites have been launched.

Accordingly, a mobile satellite communication antenna must have a function to identify a target satellite among a number of satellites.

If the satellite communication antenna faultily identifies a wrong satellite as a target satellite and transmits a signal to a wrong satellite, serious satellite communication interference and damages may be occurred.

In order to solve such a program, a conventional method of identifying a target satellite is introduced. The conventional method directly searches a plurality of satellites existed in a same frequency band, memorizes comparative locations of satellites, and points to the target satellite using a gyro sensor installed on a moving object based on the memorized comparative locations between satellites.

However, the conventional method may not identify satellites when the satellites are searched with an identical distance in a same frequency band because the conventional method identifies the target satellite using only the comparative location between satellites.

As another conventional technology of identifying the target satellite, a conventional apparatus is introduced. The conventional apparatus searches a signal of a target satellite by identifying a network ID (NID), which is a satellite information signal of a MPEG-2 transmitting stream in a satellite signal based on a DVB-s scheme.

However, the conventional apparatus performs the operation for searching the NID and the satellite signal using an external terminal such as a set-top box. That is, such an operation is not performed in a satellite antenna. Therefore, it is very complicated to perform the operation in the conventional apparatus, and the conventional apparatus also requires comparative longer time to identify the target satellite.

Furthermore, a conventional satellite communication antenna cannot determine whether a received signal is transmitted from a target satellite or not when the conventional satellite antenna receives satellite signals in a same frequency band although the received signals are transmitted through different channels.

DISCLOSURE

Technical Problem

It is, therefore, an object of the present invention to provide a target satellite identifying apparatus easily implemented in a satellite communicate antenna for quickly identifying a target satellite, and identifying not only satellites in a geostationary orbit but also mobile satellites by comparing and analyzing unique downlink frequency spectrums of satellites, and a method thereof.

Technical Solution

In accordance with one aspect of the present invention, there is provided an apparatus for identifying a target satellite in a satellite communication antenna, the apparatus including: a power splitting unit for splitting a signal inputted through the satellite communication antenna to more than two signals; a tuner unit for receiving the split signals from the power splitting unit and passing only signal of a predetermined channel frequency band; an analog-to-digital converting unit for converting each of signal intensities passed in the tuner unit to a digital value; and a controlling and identifying unit for determining whether a satellite traced by the satellite communication antenna is a target satellite using each of the signal intensities of the predetermined channel frequency band inputted from the A/D converting means, and controlling an orientation direction of the satellite communication antenna.

In accordance with another aspect of the present invention, there is provided a method for identifying a target satellite in a satellite communication antenna, the method including the steps of: a) preparing downlink frequency arrangement information of each satellite; by setting a channel frequency and a bandwidth of each tuner; c) rotating the satellite communication antenna to an azimuth angle direction; d) determining whether a satellite signal is acquired; e) performing the step c) if the satellite signal is not acquired; f) memorizing a location of a satellite when the satellite signal is acquired; g) tracing the acquired satellite; h) obtaining an output signal intensity of each tuner at a tuner unit; and i) identifying whether the currently traced satellite is the target satellite based on the output signal intensity.

ADVANTAGEOUS EFFECTS

A target satellite identifying apparatus and method according to the present invention quickly and conveniently identifies a target satellite from a plurality of satellite having a same target frequency band of a satellite communication antenna by comparing and analyzing a downlink frequency spectrum of satellite.

Furthermore, the target satellite identifying apparatus and method according to the present invention does not require supplementary equipments to identify a target satellite because the target satellite identification apparatus and method use a unique downlink frequency spectrum which is used in a satellite.

Moreover, the target satellite identifying apparatus and method according to the present invention identifies the target satellite although an operating receiving frequency of the satellite communication antenna is not matched with a satellite beacon frequency.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and aspects of the invention will become apparent from the following description of the embodiments with reference to the accompanying drawings, which is set forth hereinafter.

Figure 1:
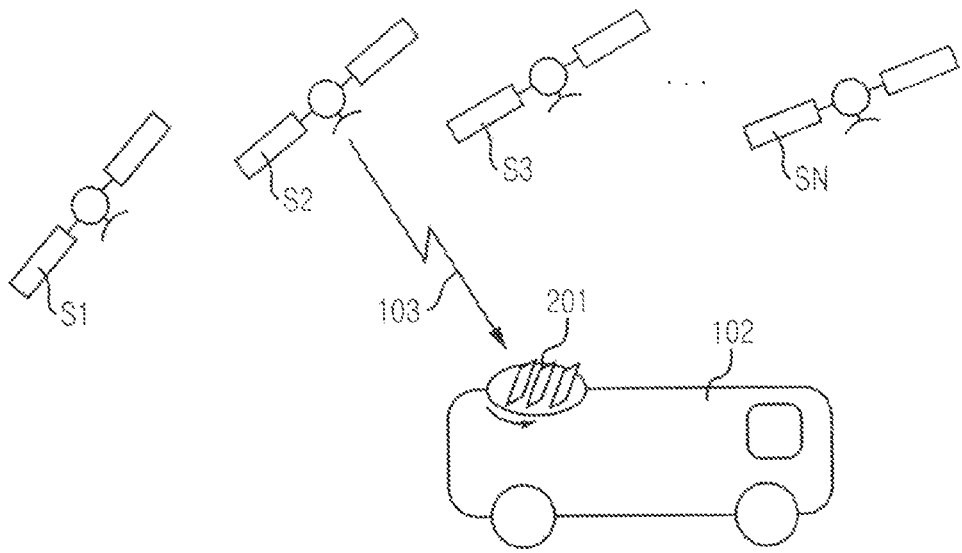
FIG. 1 shows relations between satellites having a same target frequency of a satellite communication antenna.

FIG. 1 shows relations between satellites having a same target frequency of a satellite communication antenna.

As shown in FIG. 1, a satellite communication antenna 201 is installed on a moving object 102 such as a vehicle or a ship. The satellite communication antenna 201 according to the present invention determines whether a currently acquired and traced satellite is a target satellite when there is a plurality of satellites S1, S2, S3, . . . , SN having a downlink frequency band same to the target satellite S2.

Figure 2:
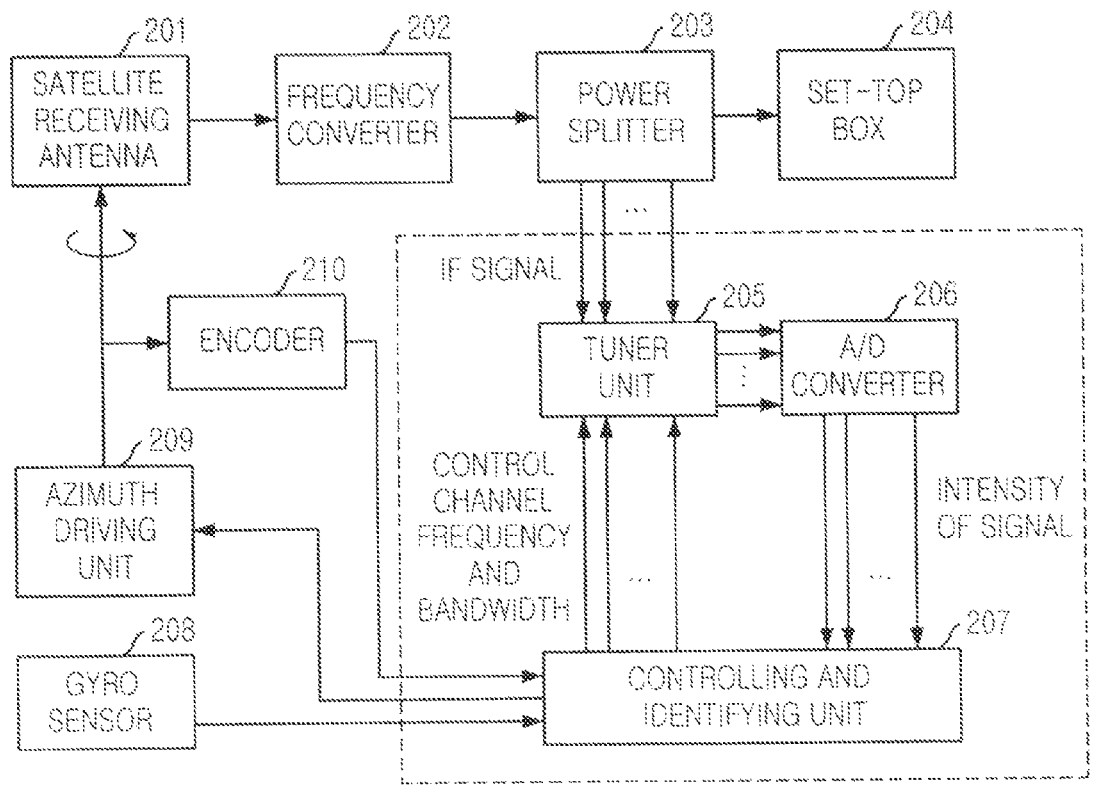
FIG. 2 is a block diagram illustrating an apparatus for identifying a target satellite in a satellite communication antenna in accordance with a preferred embodiment of the present invention.

FIG. 2 is a block diagram illustrating an apparatus for identifying a target satellite in a satellite communication antenna in accordance with a preferred embodiment of the present invention.

As shown in FIG. 2, the apparatus for identifying a target satellite according to the present embodiment includes a satellite communication antenna 201 installed on a moving object for receiving a satellite signal; a frequency converter 202 for converting the receiving satellite signal through the satellite communication antenna 201 to a predetermined frequency band and amplifying the converted signal with low noise; a power splitter 203 for splitting the output signal of the frequency converter 202 to N+1 paths; a set-top box 204 for receiving one of N+1 split signals from the power splitter 203, and receiving a satellite broadcasting or communicating with the satellite; a tuner unit 205 for receiving N split signals excepting the signal inputted to the set-top box 204 and receiving each of specific frequency channel satellite signals; an analog-to-digital (A/D) converter 206 for converting a satellite signal intensity of each specific frequency channel to a digital signal; a controlling and identifying unit 207 for receiving the digital signal from the A/D converter 206, controlling each of specific channel frequencies and bandwidths in the tuner unit 205, and controlling an azimuth angle of the antenna 201 by receiving posture information of the moving object and azimuth angle data of the antenna 201; a gyro sensor 208 for sensing the posture of the moving object; an azimuth driving unit 209 for driving the azimuth angel of the antenna 201; and an encoder 210 for recognizing a comparative azimuth rotation angel between a moving object and the antenna 201.

The frequency converter 202 may not be included in the apparatus for identifying a target satellite according to the present embodiment.

Also, the controlling and identifying unit 207 controls the satellite communication antenna 201 to trace and acquire the target satellite while the moving object is moving, and includes a predetermined memory unit. The controlling and identifying unit 207 also discriminates the target satellite from a plurality of satellites by identifying the target satellite.

Figure 3:
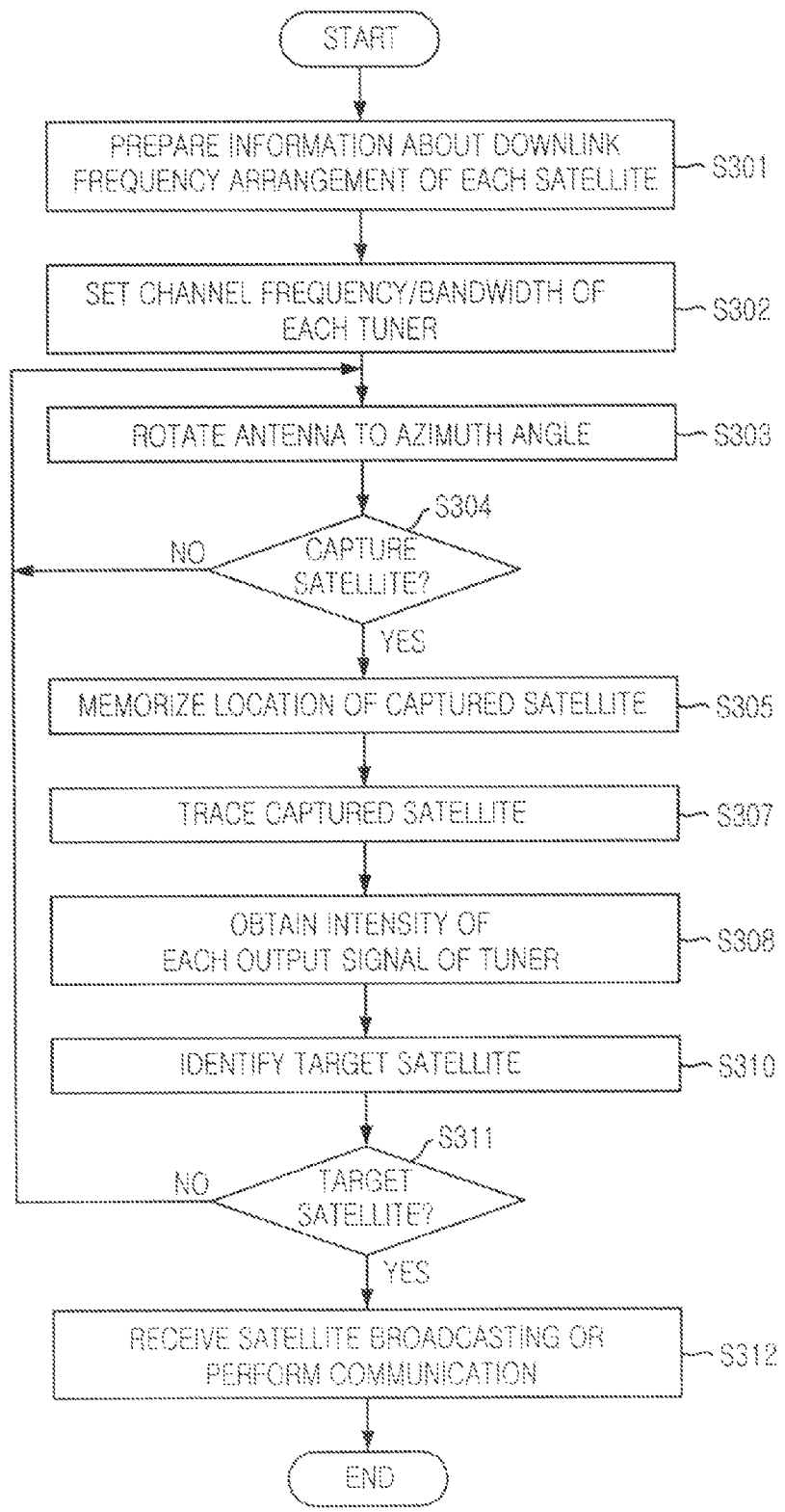
FIG. 3 is a flowchart showing a method for identifying a target satellite of a satellite communication antenna in accordance with a preferred embodiment of the present invention.

FIG. 3 is a flowchart showing a method for identifying a target satellite of a satellite communication antenna in accordance with a preferred embodiment of the present invention.

At first, downlink frequency arrangement information of satellites is prepared at step S301.

A channel frequency and a bandwidth of each tuner are set at step S302. The satellite communication antenna 201 is rotated to an azimuth angle with a predetermined speed and angle at step S303.

After then, the satellite antenna 201 determines whether a satellite signal is acquired or not while rotating at step S304.

If the satellite signal is not acquired at step S304, the step S303 is repeatedly performed, and if the satellite signal is acquired at step S304, a location of the satellite is memorized by obtaining information from the encoder 210 and the gyro sensor 208 at step S305.

Then, the acquired satellite is continuously traced at step S307 and output signal intensities of each tuner are obtained from the tuner 205 at step S308.

The traced satellite is identified whether it is a target satellite or not a step S310, and determines whether the traced satellite is the target satellite or not at step S311.

If the traced satellite is not the target satellite, the step S303 is re-performed. If the traced satellite is the target satellite, the satellite communication antenna receives satellite broadcasting or communicates with the target satellite at step S312.

Herein, in the step S301, a user prepares information about unique downlink frequency spectrums of satellites and stores the information in a predetermined memory in the controlling and identifying unit 207. Or, a satellite signal intensity of each unique channel frequency generated from the tuner 205 and information of satellite location is stored in the predetermined memory in the controlling and identifying unit 207 whenever the satellite communication antenna 201 acquires a satellites while the satellite communication antenna is rotating to an azimuth angle more than one time for preparing downlink frequency arrangement information of each satellite in the step S301.

Figure 4:
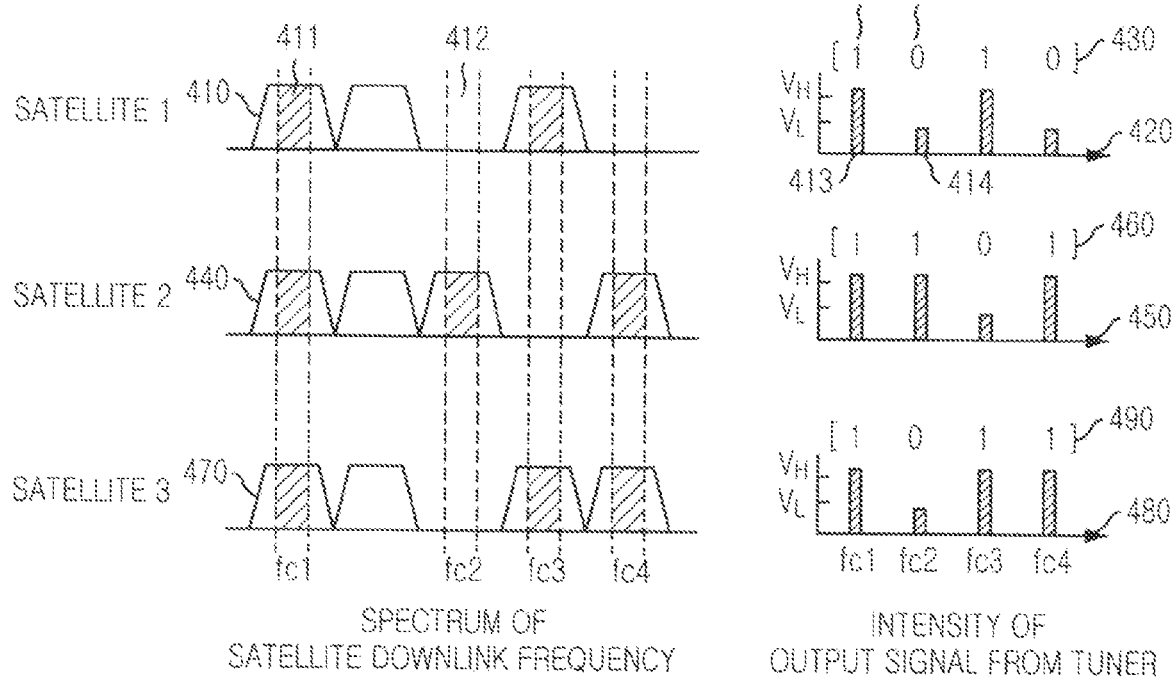
FIG. 4 is a graph for explaining a method for identifying a target satellite using a satellite downlink frequency spectrum in accordance with a preferred embodiment of the present invention.

FIG. 4 is a graph for explaining a method for identifying a target satellite using a satellite downlink frequency spectrum in accordance with a preferred embodiment of the present invention.

Downlink frequency spectrums 410, 440, 470 of each satellite are shown in FIG. 4 when there are satellites 1, 2, 3 having a same frequency $f_{c1}$ which is a target frequency of the satellite communication antenna 201 and the target satellite is a satellite 3.

If there are four tuners in the tuner unit 205, the controlling and identifying unit 207 sets satellite signal receiving channels for the tuner 1 to tuner 4 as $f_{c1}$, $f_{c2}$, $f_{c3}$ and $f_{c4}$.

When the satellite 1 is acquired in the step S304 of FIG. 3, satellite signal intensities of four tuners are shown in a graph 420 in FIG. 4.

That is, the satellite signal intensity 413 in the $f_{c1}$ frequency channel region 411 of the satellite 1 is shown as a low voltage, and the satellite signal intensity 414 in the $f_{c2}$ frequency channel region 411 of the satellite 1 is shown as a high voltage.

As described above, a satellite downlink spectrum characteristics code can be generated to be configured with 1s and 0s as shown in a numeral reference 430 in FIG. 4 by analyzing the heights of signal intensities of downlink frequencies in four channel regions of the satellite 1.

By using the identical method, each satellite downlink frequency spectrum characteristics code 460 and 490 for the satellite 2 and 3 can be generated using 1s and 0s as shown in FIG. 4.

Accordingly, the satellite is identified by analyzing the generated downlink frequency spectrum characteristics code.

As another embodiment of the present invention, the satellite can be identified based on the above descried method using only one tuner of the tuner unit 205 shown in FIG. 2.

In case of using one tuner, the controlling and identifying unit 207 orderly sets $f_{c1}$, $f_{c2}$, $f_{c3}$ and $f_{c4}$ with a regular time interval to the tuner unit 205, obtains satellite receiving signal intensities for each channel frequency, and generates a downlink frequency spectrum characteristics code of the acquired satellite.

If there are two tuners in the tuner unit 250, the controlling and identifying unit 207 may set $f_{c1}$, $f_{c2}$ to a first tuner and set $f_{c3}$ and $f_{c4}$ to a second tuner with a regular time interval and obtain satellite receiving signal intensities for each channel frequency to generate the downlink frequency spectrum characteristics code.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application No. 2004-0099949, filed with the Korean Intellectual Property office on Dec. 1, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for identifying a target satellite in a satellite communication antenna, the method comprising the steps of:
    a) preparing downlink frequency arrangement information of each satellite;
    b) setting a channel frequency and a bandwidth of each tuner;
    c) rotating the satellite communication antenna to an azimuth angle direction;
    d) determining whether a satellite signal is acquired;
    e) performing the step c) if the satellite signal is not acquired;
    f) memorizing a location of a satellite when the satellite signal is acquired;
    g) tracing the acquired satellite;
    h) obtaining an output signal intensity of each tuner at a tuner unit; and
    i) identifying whether the currently traced satellite is the target satellite based on the output signal intensity.

2. The method as recited in claim 1, further comprising the steps of:
    j) performing operations to receive satellite broadcasting or to communicate when the currently traced satellite is the target satellite; and
    k) performing the step c) when the currently traced satellite is not the target satellite.

3. The method as recited in claim 1, wherein the step a) includes the step of a-1) storing a downlink spectrum code for unique downlink frequency spectrum of each satellite.

4. The method as recited in claim 3, wherein in the step a-1), the downlink spectrum code is generated by obtaining a satellite signal intensity of each channel frequency generated in a turner unit whenever the satellite communication antenna acquires a satellite while the satellite is rotating to an azimuth angle more than one time.

5. The method as recited in claim 1, wherein in the step f), an absolute location of a satellite is memorized using a comparative rotation angle of the satellite communication antenna and posture information of a moving object.

6. The method as recited in claim 1, wherein in the step h), a plurality of satellite channel frequencies are orderly set within a predetermined time interval to a tuner when the tuner unit include one tuner and there are a plurality of different satellite channel frequencies.

7. The method as recited in claim 1, wherein in the step h), a plurality of satellite channel frequencies is distributed and set to each tuner within a predetermined time interval when the tuner unit includes more than two tuners and there are a plurality of different satellite channel frequencies.

8. The method as recited in claim 1, wherein in the step i), unique downlink frequency spectrum characteristics of the acquired satellite are compared and analyzed to identify the target satellite.

9. The method as recited in claim 8, wherein the unique downlink frequency spectrum characteristics are a binary code of the frequency spectrum.

* * * * *